(12) United States Patent
Kim et al.

(10) Patent No.: US 8,711,581 B2
(45) Date of Patent: Apr. 29, 2014

(54) SYNCHRONOUS RECTIFIER NETWORK UNIT CIRCUIT AND METHOD

(75) Inventors: Jin-Tae Kim, Seoul (KR); Gwan-Bon Koo, Bucheon (KR); Jinho Choi, Lewisville, TX (US)

(73) Assignee: Fairchild Korea Semiconductor Ltd., Bucheon (KR)

( * ) Notice: Subject to any disclaimer, the term of this patent is extended or adjusted under 35 U.S.C. 154(b) by 468 days.

(21) Appl. No.: 12/361,785

(22) Filed: Jan. 29, 2009

(65) Prior Publication Data
US 2010/0188871 A1 Jul. 29, 2010

(51) Int. Cl.
*H02M 3/335* (2006.01)

(52) U.S. Cl.
USPC ...................................... 363/21.06

(58) Field of Classification Search
USPC ............................. 363/125, 127, 21.02–21.18; 323/281–290
See application file for complete search history.

(56) References Cited

U.S. PATENT DOCUMENTS

| | | | |
|---|---|---|---|
| 4,599,554 A | 7/1986 | Jaycox et al. | |
| 6,011,703 A * | 1/2000 | Boylan et al. | 363/21.06 |
| 6,055,170 A | 4/2000 | Yee | |
| 6,243,277 B1 * | 6/2001 | Sun et al. | 363/65 |
| 6,396,250 B1 * | 5/2002 | Bridge | 323/283 |
| 6,535,400 B2 * | 3/2003 | Bridge | 363/21.06 |
| 7,269,038 B2 * | 9/2007 | Shekhawat et al. | 363/71 |
| 2005/0122753 A1 | 6/2005 | Soldano | |

OTHER PUBLICATIONS

Dianbo Fu, Et al., "1MHz High Efficiency LLC Resonant Converters with Synchronous Rectifier", 2007, pp. 2404-2410, IEEE 1-4244-0655-2/07.
IR1167ASPbF, SmartRectifier Control IC, Data Sheet PD60254D, Oct. 2007, pp. 1-15.
Application Note AN-1087, Design of Secondary Side Rectification using IR1167 SmartRectifier Control IC, Mar. 2006, pp. 1-32.

* cited by examiner

*Primary Examiner* — Adolf Berhane
*Assistant Examiner* — Yemane Mehari
(74) *Attorney, Agent, or Firm* — Okamoto & Benedicto LLP (57) ABSTRACT

A synchronous rectifier network unit and synchronous rectifying method. The synchronous rectifier network unit includes a first body diode to which a first current flows at a first time when the first current flows to a first coil, and a first transistor which is turned on after the first body diode is conducted, and to which the first current flows, and it rectifies the first current by differently controlling the turn-off time of the first transistor according to the first current.

16 Claims, 4 Drawing Sheets

SYNCHRONOUS RECTIFIER NETWORK UNIT CIRCUIT AND METHOD

BACKGROUND OF THE INVENTION (a) Field of the Invention

The present invention relates generally to a synchronous rectifying device and method, and more particularly but not exclusively to a synchronous rectifying device and method applicable to a resonant converter.

(b) Description of the Related Art

A conventional converter for outputting a DC voltage uses a diode rectifier. However, a conduction loss of the diode rectifier causes a power loss of the converter. When the diode is conducted to flow the current, a conduction loss is generated by the forward-voltage drop of the diode and the flowing current.

In order to reduce the conduction loss on the secondary side, the converter can use synchronous rectifier network unit using a switch such as a MOSFET. The conventional converter uses a winding voltage at the secondary coil of the transformer configuring a converter for generating a gate signal for controlling the switch.

However, in the case of the resonant converter, it is difficult to control the synchronous rectifier network unit switching by using the winding voltage at the secondary coil of the transformer. In the case of an LLC resonant converter including a resonance inductor, a resonance capacitor, and a plurality of power switches, while the power switches are turned on, the current having a resonance frequency determined by the resonance inductor and the resonance capacitor flows to the power switches. When the current flowing through the power switches becomes less than the current flowing through a magnetizing inductor configuring the resonance inductor, and during the dead time in which the power switches are turned off, no current flows to the transformer secondary coil, and a voltage with ripple is generated at the secondary coil of the transformer by resonance. Further, to prevent the output capacitor from being discharged, the synchronous rectifying device has to be turned off before the current flowing to the synchronous rectifying device becomes 0. Hence, it is difficult to generate a control signal for controlling the synchronous rectifier network unit switch stably.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a synchronous rectifier network unit device and method.

An exemplary embodiment of the present invention provides a synchronous rectifier network unit for synchronously rectifying power including: a coil for supplying the power; a first body diode to which a current flows at a first time when the current flowing to the coil is generated; and a first transistor which is turned on when the first body diode is conducted and to which the current flows, wherein the current is rectified by differently controlling the turn-off time of the first transistor according to the current.

When the peak value of the current becomes greater than a reference current within a predetermined period from the first time, the synchronous rectifier network unit turns off the first transistor when the current becomes greater than the reference current and then reduces to be the reference current.

When the peak value of the current does not become greater than a reference current within a predetermined period from the first time, the synchronous rectifier network unit turns on the first transistor and turns it off at a time in advance to the time when the current does not flow.

The synchronous rectifier network unit includes: a current conducting detector for generating a trigger signal by detecting a time when the first body diode is conducted; a pulse demodulator for receiving the trigger signal, and generating a demodulation signal for controlling turn-off of the first transistor; and a control logic unit for receiving the trigger signal, the demodulation signal, and a detection voltage corresponding to the current, and determining on/off of the first transistor.

The current conducting detector generates the trigger signal by using a result of comparing a voltage corresponding to a drain voltage of the first transistor and a predetermined first reference voltage.

The pulse demodulator includes: a variable current generator for generating a first ramp signal that is increased during a period corresponding to the trigger signal, and generating a variable current according to the peak value of the first ramp signal; and a demodulation signal generator for generating the demodulation signal by using a second ramp signal increasing with a predetermined slope according to the variable current.

The demodulation signal generator generates the demodulation signal during a period from the time when the second ramp signal is increased to the time when it reaches a predetermined second reference voltage.

The control logic unit turns off the first transistor according to the demodulation signal when the detection voltage does not reach a predetermined reference voltage for a predetermined period, and it turns off the first transistor at the time when the detection voltage is reduced to be the reference voltage when the detection voltage becomes greater than the reference voltage within the predetermined period.

Another embodiment of the present invention provides a synchronous rectification method for rectifying a current flowing to a coil including: controlling the current to flow to a body diode at a first time when the current is generated at the coil; turning on a transistor when the body diode is conducted, and controlling the current to flow to the transistor; and differently controlling the turn-off time of the transistor according to the current.

Differently controlling the turn-off time of the transistor includes, when the peak value of the current becomes greater than a reference current within a predetermined period from the first time, turning off the transistor when the current becomes greater than the reference current and then reduces to be the reference current.

Differently controlling the turn-off time of the transistor includes, when the peak value of the current does not become greater than a reference current within a predetermined period from the first time, turning on the transistor, and turning it off at a time in advance to the time when the current does not flow.

Controlling the current to flow to the transistor includes: generating a trigger signal by detecting the time when the body diode is conducted; and turning on the transistor in synchronization with the trigger signal.

Generating the trigger signal includes generating the trigger signal by using a result of comparing a voltage corresponding to a drain voltage of the transistor and a predetermined first reference voltage.

Differently controlling the turn-off time of the transistor includes: receiving the trigger signal, and generating a demodulation signal for controlling the turn-off of the transistor; and receiving the trigger signal, the demodulation signal, and a detection voltage corresponding to the current, and determining the on/off of the transistor.

Generating the demodulation signal includes: generating a first ramp signal increasing during a period corresponding to the trigger signal, and generating a variable current according to the peak value of the first ramp signal; generating a second ramp signal increasing with a predetermined slope according to the variable current; and generating the demodulation signal during a period from a time when the second ramp signal starts to be increased to a time when it reaches a predetermined second reference voltage.

Determining the on/off of the transistor includes: turning off the transistor according to the demodulation signal when the detection voltage fails to reach a predetermined reference voltage for a predetermined period; and turning off the transistor at a time when the detection voltage is reduced to be the reference voltage when the detection voltage becomes greater than the reference voltage within the predetermined period.

The present invention provides a synchronous rectifier network unit device and method for providing a synchronized rectified current.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

Figure 1:
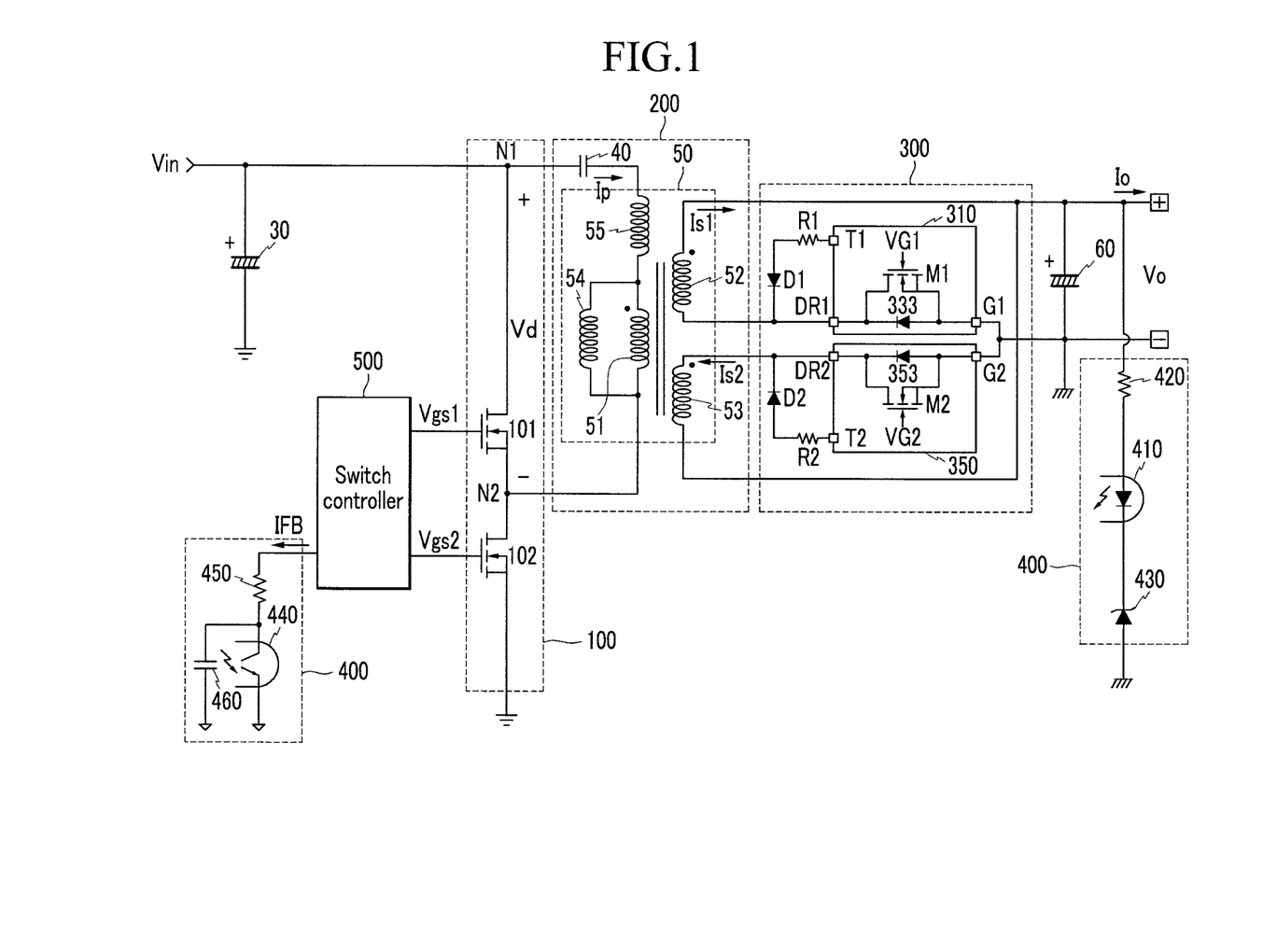
FIG. 1 shows a converter according to an exemplary embodiment of the present invention.

FIG. 1 shows a converter to which a synchronous rectifier network unit is applied according to an exemplary embodiment of the present invention.

As shown in FIG. 1, the converter includes a switch unit 100, a resonant network unit 200, a synchronous rectifier network unit 300, a feedback information generator 400 and a switch controller 500.

The switch unit 100 includes an upper switch 101 and a lower switch 102. The switch unit 100 generates a square wave from a DC input voltage by a switching operation of the upper switch 101 and the lower switch 102. In detail, the upper switch 101 and the lower switch 102 are alternatively turned on/off. A drive voltage Vd between a node N1 and a node N2 becomes a square wave having the peak value with the same level as the voltage Vin and the bottom value of 0V. The peak value of the drive voltage Vd corresponds to the voltage Vin. The upper switch 101 is controlled by a gate control signal Vgs1 provided by the switch controller 500 and the lower switch 102 is controlled by the gate control signal Vgs2. In this exemplary embodiment of the present invention, the upper switch 101 and the lower switch 102 are realized with metal oxide semiconductor field-effect transistors (MOSFET's), which is the n channel type. But the present invention is not limited by this. The upper switch 101 and the lower switch 102 are realized with p channel type MOSFET. In addition, the upper switch 101 and the lower switch 102 are realized with BJT (bipolar junction transistor) and IGBT (Insulated gate bipolar transistor).

The resonant network unit 200 includes a transformer 50 having a first coil 51 that is a primary coil and a second coil 52 and a third coil 53 that are secondary coils, and a capacitor 40. In FIG. 1, inductors 54 and 55 stand for the magnetizing and leakage inductance of the transformer, respectively, configured with the primary coil 51 and the secondary coils 52 and 53. In detail, the inductor 54 corresponds to the magnetizing inductance, and the inductor 55 corresponds to the leakage inductance. In the converter according to an exemplary embodiment of the present invention, resonance is generated among the magnetizing inductance 54, the leakage inductance 55, and the capacitor 40. The input current Ip input to the resonant network unit 200 shows a sine waveform by the resonance. The voltage at the first coil 51 is transferred at the second coil 52 and the third coil 53 by the turn ratio of the first coil 51 and the second coil 52, and the turn ratio of the first coil and the third coil 53. The waveform of the input current Ip is the sum of the current that is generated when the currents Is1 and Is2 reflect the primary coil 51 with the turn ratios and the magnetizing component current generated by magnetizing inductance.

The synchronous rectifier network unit 300 rectifies the currents Is1 and Is2 flowing to the second and third coils 52 and 53. The first and second rectified currents Is1 and Is2 flow into the output capacitor 60 and the load. In the exemplary embodiment of the present invention, rectification represents controlling the currents of the second and third coils 52 and 53 to flow in the direction to the output capacitor 60 and the load coupled to the output terminal. The synchronous rectifier network unit 300 includes a first rectification controller 310 and a second rectification controller 350. The first rectification controller 310 includes a trigger terminal T1, a drain terminal DR1, and a ground terminal G1, and a resistor R1 and a diode D1 are coupled in series between the trigger terminal T1 and the drain terminal DR1. It is an exemplary embodiment of the present invention, and the present invention is not restricted thereto. The trigger terminal T1 can be directly coupled to the drain terminal DR1 or can be coupled with the only resistor R1. The drain terminal DR1 is coupled to a first terminal of the second coil 52, and the ground terminal G1 is grounded. The second rectification controller 350 includes a trigger terminal T2, a drain terminal DR2, and a ground terminal G2, and a resistor R2 and a diode D2 is coupled in series between the trigger terminal T2 and the drain terminal DR2. The drain terminal DR2 is coupled to a first terminal of the second coil 53, and the ground terminal G2 is grounded. Second terminals of the second coil 52 and the third coil 53 are coupled to a first terminal of the output capacitor 60. The first rectified current Is1 flows to the first rectification controller 310 and the second coil 52, and the second rectified current Is2 flows to the second rectification controller 350 and the third coil 53. The output capacitor 60 is charged by the first rectified current Is1 and the second rectified current Is2. The output current Io supplied to the load is determined by a first rectified current Is1, a second rectified current Is2, and a current from the output capacitor 60. The voltage at the output capacitor 60 corresponds to the output voltage Vo. When the load increases, the output capacitor 60 is discharged to supply the current. Then, the output voltage Vo is reduced. The first and second rectification controllers 310 and 350 will be described later with reference to FIG. 2.

The feedback information generator 400 generates the information on the output voltage and transmits it to the switch controller 500. The feedback information generator 400 includes an opto-diode 410, an opto-transistor 440, a zener diode 430, a resistor 420, a feedback resistor 450 and a capacitor 460. The resistor 420 has a first terminal coupled to an output terminal (+), and a second terminal coupled to an anode of the opto-diode 410. The opto-diode 410 has a cathode coupled to a cathode of the zener diode 430, and an anode of the zener diode 430 is grounded. The opto-transistor 440 forms an opto-coupler together with the opto-diode 410, and a current flowing to the opto-transistor 440 is in proportion to the current of the opto-diode 410. The opto-transistor 440 has a first electrode coupled to a first terminal of the feedback resistor 450 and a first terminal of the capacitor 460. The capacitor 460 has a second terminal that is grounded, and the feedback resistor 450 has a second terminal coupled to the switch controller 500. The zener diode 430 functions to maintain the cathode voltage. The output voltage Vo is applied to the zener diode 430 through the opto-diode 410 and the resistor 420. Therefore, when the output voltage Vo is increased, the current input to the opto-diode 410 is increased. When the output voltage Vo is decreased, the current input to the opto-diode 410 is decreased as well. When the output voltage Vo is increased so that the current through opto-diode 410 increases, and the current flowing to the opto-transistor 440 is increased. Then, the voltage at the capacitor 460 is decreased. The switch controller 500 controls the current supplied to the feedback information generator 400 so as to maintain the voltage at the second terminal of the feedback resistor 450, and controls operational frequencies of the upper and lower switches 101 and 102 depending on the current supplied to the feedback information generator 400. The switch controller 500 includes an oscillator (not shown) for generating internal clock signals whose frequency is determined by the current IFB. The operational frequency is determined by the frequency of the internal clock signals. When the output voltage is increased, the current flowing to the opto-transistor 440 increases. Therefore, the voltage at the capacitor 460 is decreased, and the current IFB flowing to the feedback resistor 450 is increased. When the current IFB is increased, the frequency of the internal clock signals is increased, which increases the operational frequency. On the contrary, when the output voltage Vo is decreased, the current flowing to the opto-transistor 440 decreases. The voltage at the capacitor 460 is increased, and the current IFB flowing to the feedback resistor 450 is decreased. When the current IFB is decreased, the frequency of the internal clock signals is decreased, which decreases the operational frequency. Consequently, when the load is decreased so that the output voltage Vo increases, the operational frequency is increased and when the load is increased so that the output voltage Vo, the operational frequency is decreased.

Figure 2:
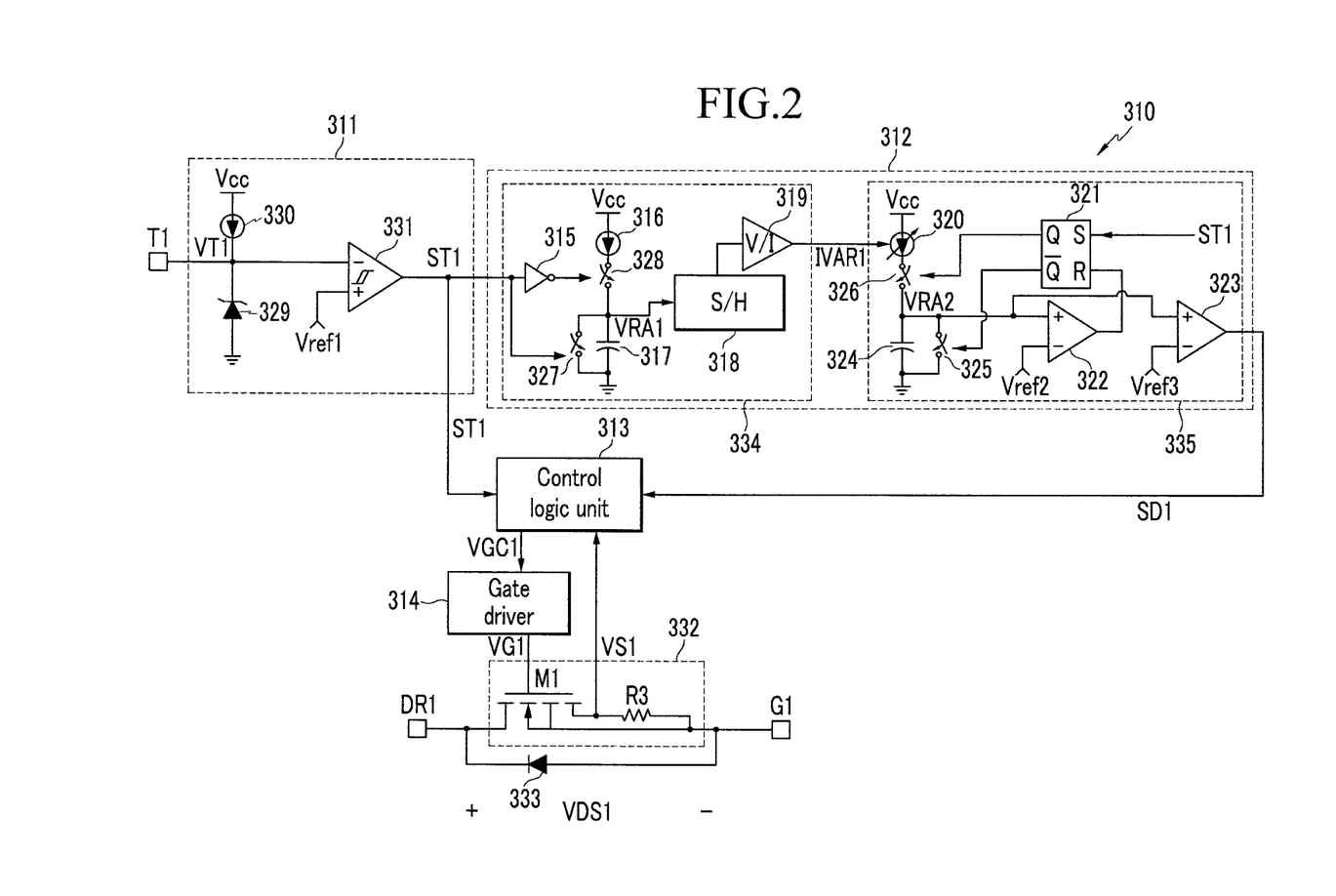
FIG. 2 shows a first rectification controller 310 of a synchronous rectifier network unit 300 according to an exemplary embodiment of the present invention.

Referring to FIG. 2, a synchronous rectifier network unit 300 according to an exemplary embodiment of the present invention will now be described in detail.

FIG. 2 shows a first rectification controller 310 of a synchronous rectifier network unit 300 according to an exemplary embodiment of the present invention. The second rectification controller 350 includes the same constituent elements as the first rectification controller 310, and it is operable by the same method.

As shown in FIG. 2, the first rectification controller 310 includes a current conducting detector 311, a pulse demodulator 312, a control logic unit 313, a gate driver 314, a sense FET 332, and a body diode 333. The body diode 333 can be a diode parasitic on the transistor M1, and it can be realized by using another diode. The sense FET 332 can be shown with the transistor M1 and the resistor R3. The sense FET 332 controls the small amount of current in proportion to the current flowing to the transistor M1 to flow to the resistor R3, and the voltage VS1 is generated at the resistor R3. The voltage VS1 is transmitted to the control logic unit 313, and the control logic unit 313 can know the current flowing to the transistor M1.

The current conducting detector 311 generates a trigger signal ST1 by detecting the time when the body diode 333 is conducted to flow the current. The trigger signal ST1 controls the transistor M1, and it controls to turn on the transistor M1 in the exemplary embodiment of the present invention. The current conducting detector 311 includes a current source 330, a zener diode 329, and a hysteresis comparator 331. When the body diode 333 is conducted, the cathode voltage of the body diode 333 becomes the voltage −VF less than the ground voltage by the forward voltage VF of the body diode. Since the current of the current source 330 flows to the diode D1 and the resistor R1, the voltage VT1 at the trigger terminal T1 becomes the voltage that is increased by the forward voltage of the diode D1 and the voltage at the resistor R1 from the cathode voltage of the body diode 333. In the exemplary embodiment of the present invention, the trigger terminal voltage VT1 is a positive voltage near 0 V by a design. The voltage VT1 at the trigger terminal is input to an inverting terminal (−) of the hysteresis comparator 331. The hysteresis comparator 331 has a non-inverting terminal (+) coupled to the reference voltage source Vref1. The reference voltage source Vref1 includes a maximum reference voltage and a minimum reference voltage, and the hysteresis comparator 331 compares the reference voltage source Vref1 and the trigger terminal voltage VT1.

The hysteresis comparator 331 generates a high-level trigger signal ST1 when the trigger terminal voltage VT1 is less than the minimum reference voltage. After the trigger signal ST1 becomes high-level, the hysteresis comparator 331 maintains the high-level trigger signal ST1 until the trigger terminal voltage VT1 becomes greater than the maximum reference voltage. When the trigger terminal voltage VT1 becomes greater than the maximum reference voltage, the hysteresis comparator 331 generates a low-level trigger signal ST1. The hysteresis comparator 331 maintains the low-level trigger signal ST1 until the trigger terminal voltage VT1 becomes less than the minimum reference voltage. When the body diode 333 is conducted, the trigger terminal voltage VT1 becomes less than the minimum reference voltage, and the hysteresis comparator 331 outputs a high-level trigger signal ST1. When the body diode 333 is not conducted, the voltage VT1 at the trigger terminal becomes greater than the maximum reference voltage and the hysteresis comparator 331 outputs a low-level trigger signal ST1. Therefore, the minimum reference voltage can be set to be a higher voltage than the trigger terminal voltage when the body diode 333 is conducted, and the maximum reference voltage is set to be a lower voltage than the trigger terminal voltage when the body diode 333 is intercepted. In this instance, when the trigger terminal voltage VT1 is greater than the breakdown voltage of the zener diode 329, the zener diode 329 is conducted, the current of the current source 330 flows through the zener diode 329, and the breakdown voltage of the zener diode 329 is applied to the inverting terminal (−) of the hysteresis comparator 331. In the exemplary embodiment of the present invention, the breakdown voltage of the zener diode 329 is set to be greater than the reference range. When the rectified current Is1 starts to flow, the body diode 333 is conducted, and when the body diode 333 is conducted, the trigger terminal voltage VT1 becomes a positive low voltage near 0V and the trigger signal ST1 becomes high-level. When the voltage at the drain terminal DR1 is increased, the rectified current Is1 no longer flows, the trigger terminal voltage VT1 is increased, and the trigger signal ST1 becomes low-level. Therefore, the trigger signal ST1 is high-level while the rectified current Is1 flows, and it is low-level while no rectified current Is1 flows. In the exemplary embodiment of the present invention, the transistor M1 is turned on in synchronization with the rising edge of the trigger signal ST1. As the load is increased in the resonant converter, the current generated at the secondary coil is increased and the period for generating the current at the secondary coil is also increased. On the contrary, the more the load is decreased, the more the current generated at the secondary coil is decreased and the period of the current flowing is decreased. Therefore, as the load is increased, the period in which the trigger signal ST1 is maintained at high-level is increased, and as the load is decreased, the period in which the trigger signal ST1 is maintained at high-level is decreased.

The pulse demodulator 312 receives the trigger signal ST1, and generates a demodulation signal SD1 for controlling to turn off the transistor M1. The pulse demodulator 312 includes a variable current generator 334 for generating a variable current according to a change of the load by using the trigger signal ST1, and a demodulation signal generator 335 for generating a demodulation signal by using a variable current.

The variable current generator 334 generates a variable current that is determined corresponding to the trigger signal ST1. The variable current generator 334 includes an inverter 315, a current source 316, a first charge switch 328, a first discharge switch 327, a ramp capacitor 317, a sample/hold unit 318, and a voltage-current converter 319. The inverter 315 inverts the input trigger signal ST1 and outputs the inverted trigger signal ST1. The first charge switch 328 is switched by an output signal of the inverter 315, and the first discharge switch 327 is switched by the trigger signal ST1. In the exemplary embodiment of the present invention, the first charge switch 328 and the first discharge switch 327 are turned on according to the high-level signal, and they are turned off according to the low-level signal. The first discharge switch 327 is coupled in parallel to the ramp capacitor 317, and the current source 316 is coupled in series to the first charge switch 328. The first discharge switch 327, the first charge switch 328, and the capacitor 317 are coupled with each other. When the first charge switch 328 is turned on and the first discharge switch 327 is turned off, the ramp capacitor 317 is charged by the current of the current source 316, and the voltage VRA1 at the ramp capacitor 317 rises. In this instance, the rising slope of the voltage is determined by the current of the current source 316. When the first discharge switch 327 is turned on and the first charge switch 328 is turned off, the ramp capacitor 317 is discharged through the first discharge switch 327, and the voltage VRA1 at the ramp capacitor 317 becomes the ground voltage. The waveform of the voltage VRA1 is a ramp waveform which rises with the slope determined by the current of the current source 316 during the period in which the trigger signal ST1 is low-level, and which has a ground voltage during the period in which the trigger signal ST1 is high-level. Hereinafter, the voltage VRA1 will be called a first ramp signal VRA1.

The sample/hold unit 318 samples the peak voltage of the first ramp signal VRA1, and holds the peak sampling voltage until the peak of the first ramp signal VRA1 is varied. The sample/hold unit 318 transmits the held peak voltage to the voltage-current converter 319.

The voltage-current converter 319 generates a variable current IVAR1 corresponding to the input peak voltage and transmits it to the variable current source 320 of the demodulation signal generator 335. The variable current source 320 reproduces the variable current IVAR1 to generate the current.

The demodulation signal generator 335 includes a variable current source 320, a second charge switch 326, a second discharge switch 325, a second ramp capacitor 324, an SR flip-flop 321, a first comparator 322, and a second comparator 323. The second charge switch 326 and the second discharge switch 325 are respectively controlled by signals transmitted from an output terminal Q and an inverting output terminal /Q of the SR flip-flop 321. The second charge switch 326 and the discharge switch 325 are turned on when the transmitted signal is high-level, and they are turned off when it is low-level. The second ramp capacitor 324 is coupled in parallel to the second discharge switch 325, and the variable current source 320 is coupled in series with the second charge switch 326. The second discharge switch 325, the second charge switch 326, and the second ramp capacitor 324 are coupled with each other. When the second charge switch 326 is turned on and the second discharge switch 325 is turned off, the second ramp capacitor 324 is charged with the current of the variable current source 320, and the voltage VRA2 at the second ramp capacitor 324 rises. In this instance, the rising slope of the voltage VRA2 is determined by the current of the variable current source 320. When the second discharge switch 325 is turned on and the second charge switch 326 is turned off, the second ramp capacitor 324 is discharged through the second discharge switch 325, and the voltage VRA2 at the second ramp capacitor 324 becomes the ground voltage. Hereafter, the voltage VRA2 will be called a second ramp signal VRA2. The SR flip-flop 321 generates an output signal when triggered with the edge of the signal that is input through the set terminal S and the reset terminal R, and generates the inverted output signal against the output signal. The generated output signal is output to the outside through the output terminal Q, and the inverted output signal is output through the inverting output terminal $\overline{Q}$. The SR flip-flop 321 generates a high-level output signal at the rising edge time when the signal input to the set terminal S rises, and it generates a low-level output signal at the rising edge time when the signal input to the reset terminal R rises. In detail, at the rising edge of the trigger signal ST1, the SR flip-flop 321 outputs a high-level signal to the second charge switch 326 through the output terminal Q. When the second charge switch 326 is turned on, the second ramp capacitor 324 is charged by the current of the variable current source 320 to increase the second ramp signal VRA2. The first comparator 322 has an inverting terminal for receiving the second reference voltage Vref2, and a non-inverting terminal for receiving the second ramp signal VRA2. The second comparator 323 has an inverting terminal for receiving the third reference voltage Vref3 approximate to 0V. The second comparator 323 has a non-inverting terminal for receiving the second ramp signal VRA2. When the second ramp signal reaches the second reference voltage Vref2, the first comparator 322 outputs a high-level signal to the reset terminal R of the SR flip-flop 321. The SR flip-flop 321 outputs a high-level signal to the second discharge switch 325 through the inverting output terminal at the rising edge of the output signal of the comparator 322. The second discharge switch 325 is turned on, the second ramp capacitor 324 is discharged, and the second ramp signal VRA2 accordingly becomes the ground voltage. When the second ramp signal VRA2 is greater than the third reference voltage Vref3, the second comparator 323 outputs a high-level demodulation signal SD1, and when it is lower than the third reference voltage Vref3, the second comparator 323 outputs a low-level demodulation signal SD1. The pulse demodulator generates a second ramp signal that is increased by the current of the variable current source to generate a high-level demodulation signal while the second ramp signal is increased up to the second reference voltage Vref2. The demodulation signal is used to determine the turn-off of the transistor M1

The control logic unit 313 receives a trigger signal, a demodulation signal and a detection voltage VS1, and generates a control signal VGC1 for determining the on/off of the transistor M1.

The gate driver 314 drives the transistor M1 for turning on or turning off according to the control signal VGC1.

The control logic unit 313 determines the turn-on time of the transistor M1 according to the trigger signal. When the trigger signal ST1 rises, the control logic unit 313 transmits a high-level gate signal VG1 to the gate driver 314. The gate driver 314 generates a high-level gate signal VG1 according to the high-level control signal VGC1 and outputs it to the transistor M1. The control logic unit 313 determines the turn-off time of the transistor M1 by using the detection voltage and the demodulation signal. In detail, when the detection voltage becomes greater than a fourth reference voltage while the demodulation signal is high-level and when the detection voltage decreases and reaches the fourth reference voltage, the control logic unit 313 generates a low-level control signal VGC1 for turning off the transistor M1. When the detection voltage fails to reach the fourth reference voltage while the demodulation signal is high-level, the control logic unit 313 generates a low-level control signal VGC1 when the demodulation signal becomes low-level. The gate driver 314 generates a low-level gate signal VG1 according to the low-level control signal VGC1 and outputs it to the transistor M1. The case in which the load is greater than a predetermined load will be called the normal load state, and the case in which the load is less than the predetermined load will be called the light load state. Here, the predetermined load is variable by the design. The converter determines the light load to be less than the predetermined load when the load is not increased to be a reference current within a predetermined reference duration after the first rectified current Is1 and the second rectified current Is2 start to flow. When it is less than the predetermined load, the turn-off time of the transistors M1 and M2 is determined irrespective of the first and second rectified currents Is1 and Is2. In detail, when it is less than the predetermined load, the transistors M1 and M2 are controlled to be turned off within the period in which the first and second rectified currents Is1 and Is2 flow. The fourth reference voltage is compared with the voltage generated at the resistor R3 when the rectified currents Is1 and Is2 flow to the transistors M1 and M2. The control logic unit 313 turns off the transistor M1 when the detection voltage VS1 becomes greater than the fourth reference voltage and then decreases and becomes to be less than the fourth reference voltage. However, when the load is reduced, the first rectified current Is1 decreases so that detection voltage VS1 decreases and, it is not increased to be greater than the fourth reference voltage. Namely, when the peak of the first rectified current Is1 becomes less than the reference current, the turn-off of the transistor M1 cannot be determined. Therefore, in order to prevent this, the control logic unit 313 turns off the transistor M1 at the falling edge of the demodulation signal SD1 when the first rectified current Is1 does not rise to the reference current ISET while the demodulation signal SD1 is high-level.

Components of the second rectification controller 350 correspond to those of the first rectification controller 310, and no corresponding descriptions will be provided. However, the first rectification controller 310 and the second rectification controller 350 have different operation periods, which will now be described with reference to FIG. 3.

Figure 3:
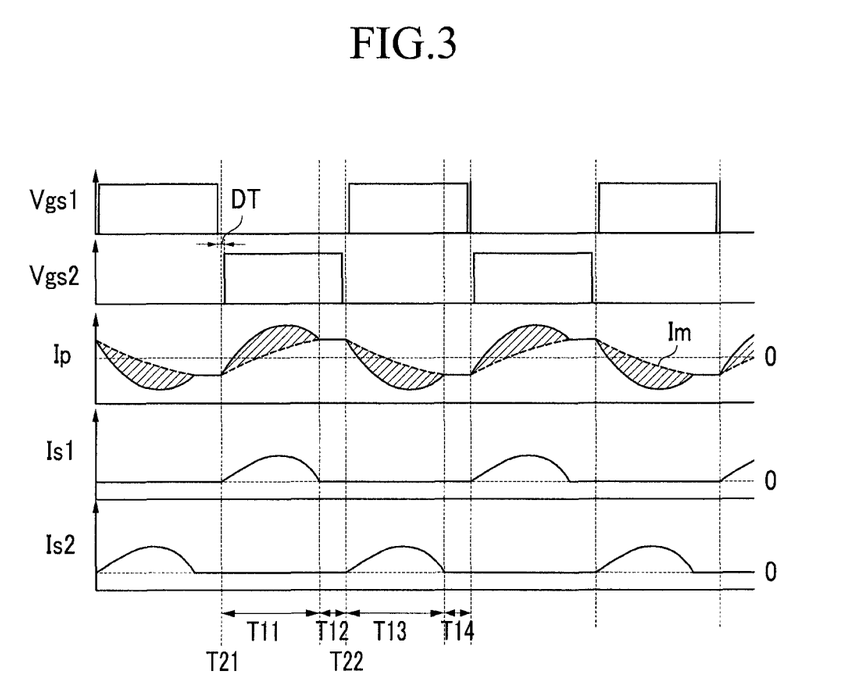
FIG. 3 shows an input current Ip, a first rectified current Is1, and a second rectified current Is2 according to an exemplary embodiment of the present invention.

FIG. 3 shows an input current Ip, a first rectified current Is1, and a second rectified current Is2 input to a first coil according to an exemplary embodiment of the present invention.

As shown in FIG. 3, the waveform of the input current Ip is shown with solid lines. The current Im shown with the dotted lines represents a magnetizing current generated by magnetizing inductance, and the magnetizing current does not influence the first and second rectified currents Is1 and Is2 flowing to the second and third coils 52 and 53. With reference to the magnetizing current Im, the shaded current is the current that is transmitted to the second coil 52 and the third coil 53. In detail, the first rectification controller 310 and the second rectification controller 350 are respectively operated when the lower switch 102 and the upper switch 101 are turned on.

First, at the time T21, a voltage at the drain terminal DR1 of the transistor M1 is reduced and the body diode 333 is forward biased so that the first rectified current Is1 starts to flow through the body diode 333. The voltage at the trigger terminal T1 of the first rectification controller 310 is reduced to turn on the transistor M1. However, since the voltage at the drain terminal DR2 of the transistor M2 is high-level and the body diode 353 of the second rectification controller 350 is reverse biased, no current flows. The transistor M2 is maintained at turn-off during the period T11. During the period T11, the first rectified current Is1 has a waveform shown in FIG. 3. The period T12 is a freewheeling period, and no first and second rectified currents Is1 and Is2 flow during it.

Next, at the time T22, the voltage at the drain terminal DR2 of the transistor M2 is reduced and the body diode 353 is forward biases so that the second rectified current Is1 starts to flow through the body diode 353. Then, the voltage at the trigger terminal T2 of the second rectification controller 350 is reduced to turn on the transistor M2. However, the voltage at the drain terminal DR1 of the transistor M1 becomes high-level and body diode 333 of the first rectification controller 310 is reverse biased, and no current flows. During the period T13, the transistor M1 is maintained at turn-off. During the period T13, the second rectified current Is1 has a waveform shown in FIG. 3. The period T14 is a freewheeling period, and the first and second rectified currents Is1 and Is2 do not flow.

Figure 4:
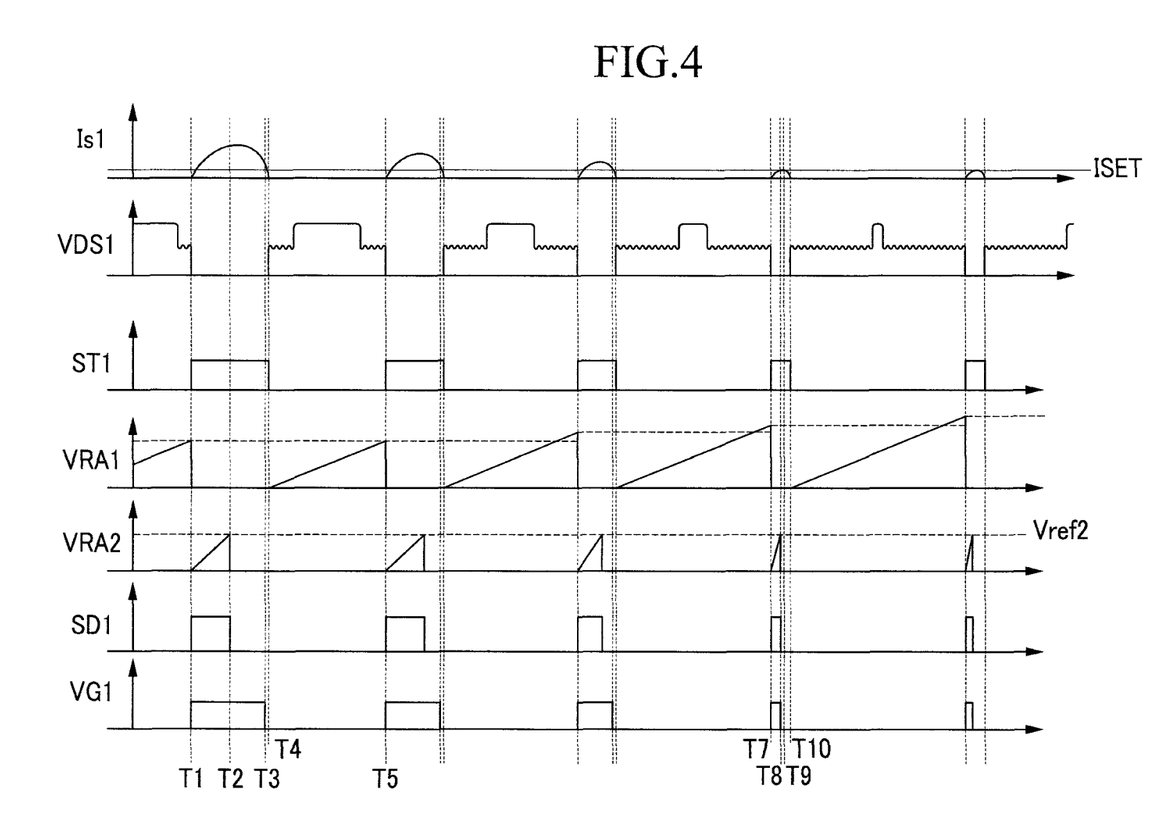
FIG. 4 shows a first rectified current Is1 and a signal generated by a synchronous rectifier network unit device 300 according to an exemplary embodiment of the present invention.

By repeating the above-noted operation, the first rectified current Is1 and the second rectified current Is2 are supplied to the output capacitor 60 and the load. The period DT represents a dead time DT when the upper switch 101 and the lower switch 102 are turned off both. Referring to FIG. 4, an operation of the first rectification controller 310 according to an exemplary embodiment of the present invention will now be described in detail.

FIG. 4 shows a first rectified current Is1 and a signal generated by a synchronous rectifier network unit device 300 according to an exemplary embodiment of the present invention. FIG. 4 is provided by assuming that the load is gradually reduced. Since the waveform of the detection voltage VS1 corresponds to that of the first rectified current Is1, FIG. 4 has shown the first rectified current Is1 instead of the detection voltage VS1. Accordingly, FIG. 4 shows the reference current ISET corresponding to the third reference voltage Vref3. That is, when the first rectified current Is1 reaches the reference current ISET, the transistor M1 is turned off. The voltage VDS1 has a ripple waveform during the freewheeling period (T14 of FIG. 3) in which the first and second rectified currents Is1 and Is2 do not flow. Before the transistor M1 is turned on, the body diode 333 is conducted to flow the first rectified current Is1. A time delay is provided between the time when the first rectified current Is1 starts to flow and the time when the transistor M1 is turned on by the trigger signal ST1 of the transistor M1.

At the time T1, when the first rectified current Is1 starts to flow, the body diode 333 is conducted, and a rising edge of the trigger signal ST1 is generated. The first discharge switch 327 is turned on by the high-level trigger signal ST1, and the first ramp signal VRA1 falls to a predetermined potential. The predetermined potential can be determined by design. The SR flip-flop 321 outputs a high-level signal to the second charge switch 326 by the high-level trigger signal ST1. The second charge switch 326 is turned on so that the second ramp signal VRA2 starts to rise, and the comparator 323 outputs a high-level demodulation signal SD1 at the time T1 when the second ramp signal VRA2 rises. The control logic unit 313 outputs a control signal VGC1 for turning on the transistor M1 at the rising edge of the trigger signal ST1, and the gate driver 314 applies a high-level gate signal VG1 to the gate electrode of the transistor M1 according to the control signal VGC1. The transistor M1 is turned on in synchronization with the time T1.

When the second ramp signal VRA2 reaches the second reference voltage Vref2 at the time T2 while the second ramp signal VRA2 is rising, the comparator 322 outputs the high-level signal to the reset terminal R of the SR flip-flop 321. The SR flip-flop 321 outputs the high-level signal to the second discharge switch 325 through the inverting output terminal /Q. The second discharge switch 325 is turned on, and the second ramp signal VRA2 becomes the ground voltage. The comparator 323 outputs a low-level demodulation signal SD1 when the second ramp signal VRA2 becomes the ground voltage.

When the first rectified current Is1 reaches the reference current ISET at the time T3, the control logic unit 313 transmits a control signal VGC1 for turning off the transistor M1 to the gate driver 314. The gate driver 314 applies a low-level gate signal VG1 to the gate electrode of the transistor M1 according to the control signal VGC1. The transistor M1 is turned off in synchronization with the time T3.

During the periods T3 to T4, the first rectified current Is1 flows through the body diode 333.

At the time T4, since the first rectified current Is1 does not flow and the drain voltage at the transistor M1 is high, the voltage VT1 at the trigger terminal is high. The hysteresis comparator 331 outputs a low-level trigger signal ST1, and the inverter 315 inverts it to generate a high-level signal. The first charge switch 328 is turned on by the high-level signal, and the first ramp signal VRA1 is increased during the periods T4 to T5.

When the first rectified current Is1 starts to flow again at the time T5, the trigger signal ST1 rises again to generate a rising edge, and the same operation as the above-noted periods T1 to T4 is repeated.

The input current Ip is gradually decreased since the load is assumed to be decreased. Therefore, the first rectified current Is1 shown in FIG. 4 is also gradually decreased. When the first rectified current Is1 starts to be decreased to be less than a predetermined value according to the reduced load, the turn-off time of the transistor M1 is determined by the demodulation signal SD1.

The first rectified current Is1 starts to flow again at the time T7, the second ramp signal VRA2 reaches the reference voltage Vref2 at the time T8, and a falling edge at which the demodulation signal SD1 falls is generated. In this instance, the control logic unit 313 determines whether the first rectified current Is1 reached the reference current ISET. When the first rectified current Is1 failed to reach the reference current ISET, the load is determined to have been reduced to be less than the predetermined load, and the transistor M1 is turned off in synchronization with the falling edge of the demodulation signal SD1.

As shown in FIG. 4, when the load is reduced and the period in which the trigger signal ST1 is high-level is reduced, the first ramp signal VRA1 rises for a longer time. Therefore, the peak value of the first ramp signal VRA1 rises step by step. When the peak value of the first ramp signal VRA1 rises, the current generated by the voltage-current converter 319 is increased, and the current of the variable current source 320 is also increased. Since the current for charging the second ramp capacitor 324 is increased, the slope for increasing the second ramp signal VRA2 is also increased. Therefore, the period in which the demodulation signal SD1 is high-level is gradually decreased. Therefore, the on time of the transistor M1 can be controlled by using the demodulation signal SD1 variable by reduction of the load. The first rectification controller 310 has been described, and the second rectification controller 350 is operable. That is, as the load is decreased, the second rectified current Is2 is decreased, and the turn-off time of the transistor M2 is determined according to the demodulation signal (not shown) generated by the second rectification controller 350.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A synchronous rectifier network unit of a power converter, the synchronous rectifier network unit comprising:
   a coil;
   a first body diode of a first transistor, the first body diode being coupled to a terminal of the coil and to which a current flows at a first time instance when the current is generated to flow through the coil;
   the first transistor coupled to the terminal of the coil and configured to turn on when the first body diode conducts; and
   a rectification controller configured to rectify the current by differently controlling the turn-off time of the first transistor according to the current, the rectification controller including a current conducting detector configured to detect a time when the first body diode is conducted.

2. The synchronous rectifier network unit of claim 1, wherein when the peak value of the current becomes greater than a reference current within a predetermined period from the first time instance, the rectification controller is configured to turn on the first transistor, and the rectification controller is configured to turn off the first transistor when the current is reduced to be the same as the reference current.

3. The synchronous rectifier network unit of claim 1, wherein when the peak value of the current does not become greater than a reference current within a predetermined period from the first time instance, the rectification controller is configured to turn on the first transistor and thereafter turn the first transistor off at a time in advance to a time when the current does not flow.

4. The synchronous rectifier network unit of claim 1, wherein the rectification controller includes:
   the current conducting detector configured to generate a trigger signal by detecting the time when the first body diode is conducted;
   a pulse demodulator configured to receive the trigger signal and to generate a demodulation signal for controlling turn-off of the first transistor; and
   a control logic unit configured to receive the trigger signal, the demodulation signal, and a detection voltage corresponding to the current, and to control turning on and off of the first transistor.

5. The synchronous rectifier network unit of claim 4, wherein the current conducting detector is configured to generate the trigger signal by using a result of comparing a voltage corresponding to a drain voltage of the first transistor with a predetermined first reference voltage.

6. The synchronous rectifier network unit of claim 4, wherein the pulse demodulator includes:
   a variable current generator configured to generate a first ramp signal that is increased during a period corresponding to the trigger signal, and to generate a variable current according to the peak value of the first ramp signal; and
   a demodulation signal generator configured to generate the demodulation signal by using a second ramp signal increasing with a predetermined slope according to the variable current.

7. The synchronous rectifier network unit of claim 6, wherein the demodulation signal generator is configured to generate the demodulation signal during a period from the time when the second ramp signal is increased to the time when it reaches a predetermined second reference voltage.

8. The synchronous rectifier network unit of claim 4, wherein the control logic unit is configured to turn off the first transistor according to the demodulation signal when the detection voltage does not reach a predetermined reference voltage for a predetermined period, and to turn off the first transistor at the time when the detection voltage is reduced to be the reference voltage when the detection voltage becomes greater than the reference voltage within the predetermined period.

9. A synchronous rectification method for rectifying a current flowing to a coil, comprising:
   controlling the current to flow to a body diode of a transistor at a first time when the current is generated at the coil;
   detecting a time when the body diode is conducted;
   turning on the transistor when the body diode is conducted, and controlling the current to flow to the transistor; and
   differently controlling the turn-off time of the transistor according to the current.

10. The synchronous rectification method of claim 9, wherein differently controlling the turn-off time of the transistor includes:
    when the peak value of the current becomes greater than a reference current within a predetermined period from the first time, turning off the transistor when the current becomes greater than the reference current and then reduces to be the same as the reference current.

11. The synchronous rectification method of claim 9, wherein differently controlling the turn-off time of the transistor includes:
    when the peak value of the current does not become greater than a reference current within a predetermined period from the first time, turning on the transistor, and turning it off at a time in advance to the time when the current does not flow.

12. The synchronous rectification method of claim 9, wherein controlling the current to flow to the transistor includes:
    generating a trigger signal by detecting the time when the body diode is conducted; and
    turning on the transistor in synchronization with the trigger signal.

13. The synchronous rectification method of claim 12, wherein generating the trigger signal includes generating the trigger signal by using a result of comparing a voltage corresponding to a drain voltage of the transistor with a predetermined first reference voltage.

14. The synchronous rectification method of claim 9, wherein differently controlling the turn-off time of the transistor includes:
    receiving the trigger signal, and generating a demodulation signal for controlling the turn-off of the transistor; and
    receiving the trigger signal, the demodulation signal, and a detection voltage corresponding to the current, and determining the on/off of the transistor.

15. The synchronous rectification method of claim 14, wherein generating the demodulation signal includes:
    generating a first ramp signal increasing during a period corresponding to the trigger signal, and generating a variable current according to the peak value of the first ramp signal;
    generating a second ramp signal increasing with a predetermined slope according to the variable current; and
    generating the demodulation signal during a period from a time when the second ramp signal starts to be increased to a time when it reaches a predetermined second reference voltage.

16. The synchronous rectification method of claim 14, wherein determining the on/off of the transistor includes:
    turning off the transistor according to the demodulation signal when the detection voltage fails to reach a predetermined reference voltage for a predetermined period; and
    turning off the transistor at a time when the detection voltage is reduced to be the reference voltage when the detection voltage becomes greater than the reference voltage within the predetermined period.

* * * * *